(12) United States Patent
Mitsui

(10) Patent No.: US 8,690,433 B2
(45) Date of Patent: Apr. 8, 2014

(54) SLIDING DEVICE FOR ELECTRONIC APPARATUS

(75) Inventor: Yasuhiro Mitsui, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 13/818,730

(22) PCT Filed: Aug. 29, 2011

(86) PCT No.: PCT/JP2011/069489
§ 371 (c)(1),
(2), (4) Date: Feb. 25, 2013

(87) PCT Pub. No.: WO2012/029723
PCT Pub. Date: Mar. 8, 2012

(65) Prior Publication Data
US 2013/0156354 A1    Jun. 20, 2013

(30) Foreign Application Priority Data

Aug. 31, 2010  (JP) ................................ 2010-193216

(51) Int. Cl.
*F16C 29/02* (2006.01)
*H04W 88/02* (2009.01)

(52) U.S. Cl.
USPC .......................................... 384/10; 455/575.4

(58) Field of Classification Search
USPC .......... 384/10, 26, 35; 455/575.4; 379/433.12
See application file for complete search history.

(56) References Cited

U.S. PATENT DOCUMENTS

| 2007/0123179 A1* | 5/2007 | Lim .............................. 455/90.3 |
| 2010/0120479 A1* | 5/2010 | Ogatsu ........................ 455/575.4 |
| 2011/0195762 A1* | 8/2011 | Noh et al. .................... 455/575.4 |
| 2011/0275422 A1* | 11/2011 | Kemppinen ............... 455/575.4 |
| 2012/0021809 A1* | 1/2012 | Park et al. .................... 455/575.4 |
| 2012/0077555 A1* | 3/2012 | Jung .......................... 455/575.4 |

FOREIGN PATENT DOCUMENTS

| JP | 2006-186577 | 7/2006 |
| JP | 2007-074411 | 3/2007 |
| JP | 2007-132508 | 5/2007 |
| JP | 2008-113067 | 5/2008 |

OTHER PUBLICATIONS

International Search Report mailed on Oct. 4, 2011.

* cited by examiner

*Primary Examiner* — Thomas R Hannon
(74) *Attorney, Agent, or Firm* — IPUSA, PLLC

(57) ABSTRACT

A sliding device for an electronic apparatus includes a contact piece projecting outward in a widthwise direction from a sliding plate and a contacted part with which the contact piece is caused to come into contact when the sliding plate is caused to slide with a maximum displacement in a rear direction relative to a base plate. The contact piece includes a partially cylindrical surface and a connecting surface. The contacted part includes a contacted shape part configured to be contacted by a boundary part of the partially cylindrical surface and the connecting surface to provide the sliding plate with a rotational force to cause a front direction end portion of the sliding plate to move in the bottom direction relative to a rear direction end portion of the sliding plate, and an engaged shape part with which the partially cylindrical surface and the connecting surface are caused to engage.

6 Claims, 14 Drawing Sheets

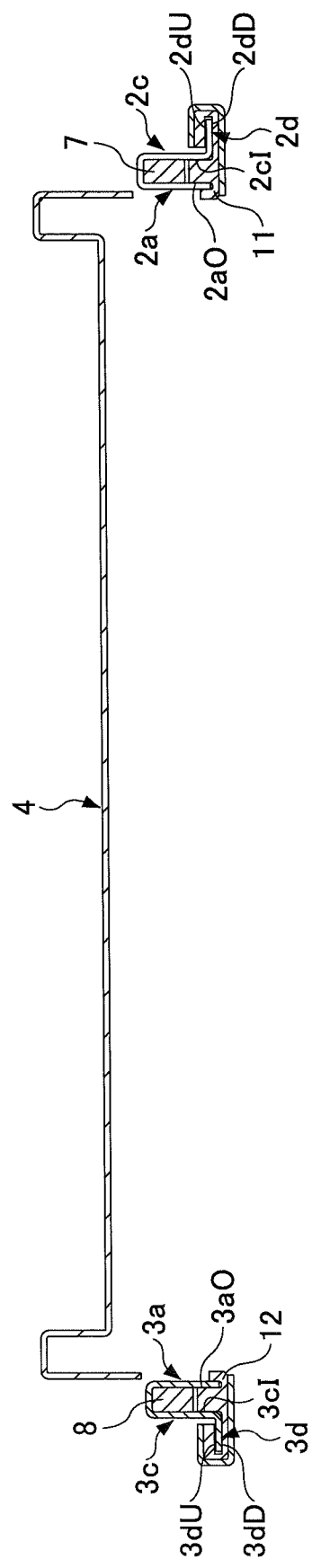

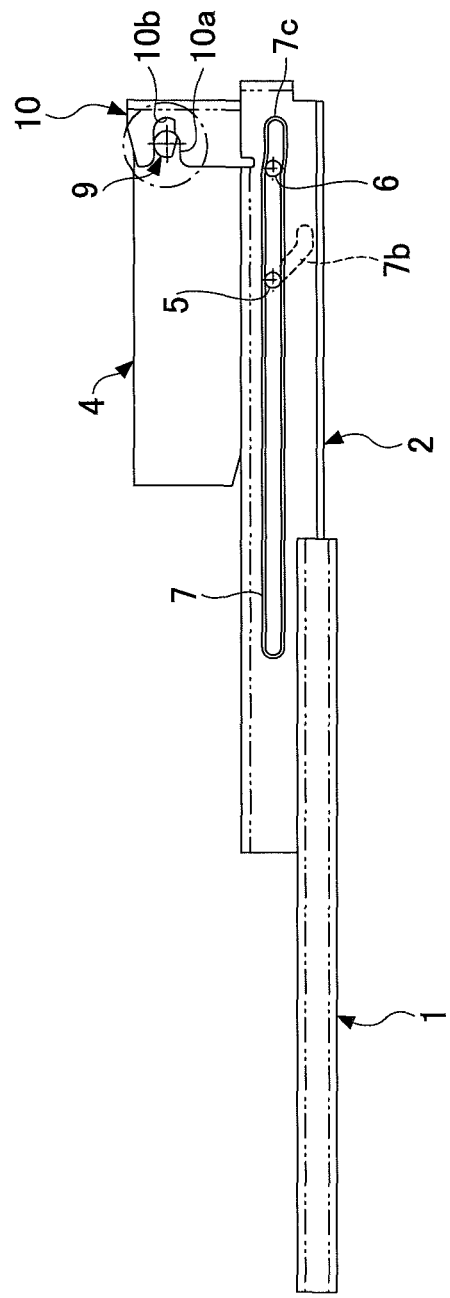

SLIDING DEVICE FOR ELECTRONIC APPARATUS

TECHNICAL FIELD

The present invention relates to a sliding device for an electronic apparatus that is suitably applied particularly to electronic apparatuses including cellular phones, portable terminals, and portable image capturing devices, the sliding device including, for example, a main body part and a sub body part and causing the sub body part to be slidable relative to the main body part.

BACKGROUND ART

As electronic apparatuses that constitute cellular phones, portable terminals, and portable image capturing devices, those are known that include a sliding device for an electronic apparatus that allows a sub body part to slide in a plane direction relative to a main body part.

For example, in cellular phones, a numeric keypad or a microphone is provided in the main body part, and a liquid crystal display unit and a loudspeaker are provided in the sub body part. A closed state in which the numeric keypad is housed may be selected when not in use, and an open state in which the numeric keypad is exposed in front of the liquid crystal display unit may be selected when in use. With this, a calling state in which the loudspeaker is positioned at an ear of a user and the microphone is positioned near the mouth or jaw of the user may be selected in cellular phones.

In this sliding device for an electronic apparatus, compared with that using a hinge mechanism, an opening or closing operation that causes the sub body part to slide relative to the main body part may be completed by pressing the sub body part in an opening direction or a closing direction alone at the initial stage of the operation, so that it is possible to make it easier to perform the operation with a single hand.

In addition, there is the advantage of not necessitating the supporting of the moment that is caused to act on the main body part by the radial bulge of a radially outside end portion of the sub body part relative to the hinge center caused by the rotation of the sub body part and the reaction of the rotation of the sub body part during an opening or closing operation. This allows a user to perform a sliding operation for an opening or closing operation with more ease and without taking the interference of the sub body part with the surroundings or inadvertent dropping into consideration.

Patent Document 1 discloses an electronic apparatus that includes a sliding device for an electronic apparatus as described above. The sliding device for an electronic apparatus illustrated in Patent Document 1 adopts a configuration where a sliding plate fixed to a sub body part is slidably connected to the base plate of a main body part through guides and rails.

Further, the sliding plate is connected to the base plate through a spring whose urging force reverses its direction during a stroke. As a result, a reaction force against a user's operation is provided in the first half of an opening operation, and an assisting force to the user's operation is provided in the second half of the opening operation. These reactive and assisting forces cause an operating force accompanying a user's sliding operation to be substantially required only in the first half of the opening operation, thus improving operability for a user.

In the sliding device for an electronic apparatus having such a configuration, the overall shape is particularly a parallelepiped shape having a laterally elongated rectangular bottom surface, and the amount of overlap of the sub body part and the main body part in an extended state is required to be as small as possible in the case of causing the sub body part to vertically slide relative to the main body part under the condition of vertical sliding directions.

As described above, in electronic apparatuses in particular, an input device such as a numeric keypad or a keyboard is often provided in the main body part, so that there tends to be a strong demand for as large an exposed surface as possible of the main body part in an open state, that is, an extended state, in view of ensuring user's convenience.

That is, in a state where the sub body part is slid and extended relative to the main body part, it is requested that the amount of overlap of the sub body part and the main body part in a sliding direction be reduced as much as possible and the exposed surface of the main body part resulting from the sliding of the sub body part in an opening direction be increased as much as possible, that is, the area of the main body part hidden by the sub body part be reduced as much as possible.

In the extended state, however, it is also necessary to ensure the stability of the sub body part at the time of a user's operation and the robustness of parts contributing to sliding including a sliding part and a slid part. Therefore, it is simultaneously requested that the sliding part and the slid part be held, that is, overlap, for a certain length. This also makes it necessary to ensure a certain amount of overlap of the sub body part and the main body part.

PRIOR ART DOCUMENT

Patent Document

[Patent Document 1] Japanese Laid-Open Patent Application No. 2008-113067

SUMMARY OF THE INVENTION

Problems to be Solved by the Invention

That is, a request for ensuring the amount of overlap, that is, the amount of holding, restricts a request for ensuring a sufficiently large area of the exposed surface of the main body part that is directed to a user in the extended state. That is, there is a problem in that it is not always easy to improve product quality by achieving both ensuring user's convenience by ensuring a desired area of the exposed surface of the main body part and ensuring operability by ensuring the stability of the sub body part in the extended state.

Further, in recent years, a so-called full-flat type electronic apparatus has been proposed that eliminates the amount of overlap of the main body part and the sub body part in an extended state, and accommodates the sub body part in a space on the opening direction side of the main body part using, for example, a hinge mechanism to position the main body part and the sub body part side by side in opening and closing directions in the same plane.

In this full-flat type electronic apparatus, an operation is necessary that links the sub body part to the main body part using the hinge mechanism after causing the sub body part to slide in an opening direction relative to the main body part, thus making the operation complicated for a user. Further, there is also a problem in that positioning the main body part and the sub body part in the same plane does not always makes the visibility of the sub body part good to a user and is not the best mode in view of design as well.

Therefore, the full-flat type electronic apparatus is required to be further developed so as to improve the visibility of the sub body part to a user and the design of the overall shape formed by the main body part and the sub body part and also to simplify a user's operation. In this case, it is requested that a mechanism be provided that implements a so-called tilting operation that causes the closing-direction end portion of the sub body part to be dropped on the opening direction side of the opening-direction end portion of the main body part in the extended state and thereby causes the extended form of the overall shape of the main body part and the sub body part to be a dogleg shape.

This tilting operation imposes a smaller operational load on the user than the above-described linking operation. In general, however, the tilting operation is an operation separate from a sliding operation. Thus, there still remains a problem in that it is not always easy to smoothly perform an opening or closing operation sequence including both a sliding operation and a tilting operation so that it is not easy to improve convenience and operability.

Means for Solving the Problems

A general object of the present invention is to provide an improved, useful sliding device for an electronic apparatus that solves the above-described problems of the conventional art.

A more specific object of the present invention is to provide a sliding device for an electronic apparatus that can improve product quality by achieving both convenience and operability and improving visibility and design.

In order to achieve these objects, the present invention is characterized by including:
   a base plate;
   a pair of intermediate plates connected to the base plate via first sliding mechanisms so as to be slidable in front and rear directions of the base plate; and
   a sliding plate connected to the pair of intermediate plates via second sliding mechanisms so as to be slidable in the front and rear directions,
      wherein each of the second sliding mechanisms includes
      a first projecting part projecting outward in a widthwise direction of the base plate from the sliding plate;
      a second projecting part positioned on a rear direction side of the first projecting part in the front and rear directions and projecting further outward in the widthwise direction than the first projecting part;
      a guide part configured to guide the first projecting part and the second projecting part in the front and rear directions;
      a branch guide part branching off from a widthwise inside portion of the guide part with which the first projecting part is in contact toward a rear direction side in the front and rear directions and a bottom direction side in top and bottom directions of the base plate;
      an end portion guide part positioned on the rear direction side of a portion of the guide part other than the widthwise inside portion;
      a contact piece positioned on the rear direction side and a top direction side in the top and bottom directions of the second projecting part and projecting outward in the widthwise direction from the sliding plate; and
      a contacted part with which the contact piece is caused to come into contact when the sliding plate is caused to slide with a maximum displacement in the rear direction relative to the base plate;
      wherein the contact piece includes a partially cylindrical surface and a connecting surface connecting both circumferential ends of the partially cylindrical surface, and the contacted part includes a contacted shape part configured to be contacted by a boundary part of the partially cylindrical surface and the connecting surface to provide the sliding plate with a rotational force to cause a front direction end portion of the sliding plate to move in the bottom direction relative to a rear direction end portion of the sliding plate, and an engaged shape part with which the partially cylindrical surface and the connecting surface are caused to engage.

Effects of the Invention

According to the present invention, it is possible to provide a sliding device for an electronic apparatus that can improve product quality by achieving both convenience and operability and improving visibility and design.

BRIEF DESCRIPTION OF THE DRAWINGS

FIG. 2D is a cross-sectional view taken along line A-A in FIG. 2A.

FIG. 4C is a (second) diagram for illustrating the operation of the sliding device for an electronic apparatus that is an embodiment of the present invention, illustrating a state where the sliding plate is in motion.

DESCRIPTION OF THE REFERENCE NUMERALS

Figure 1:
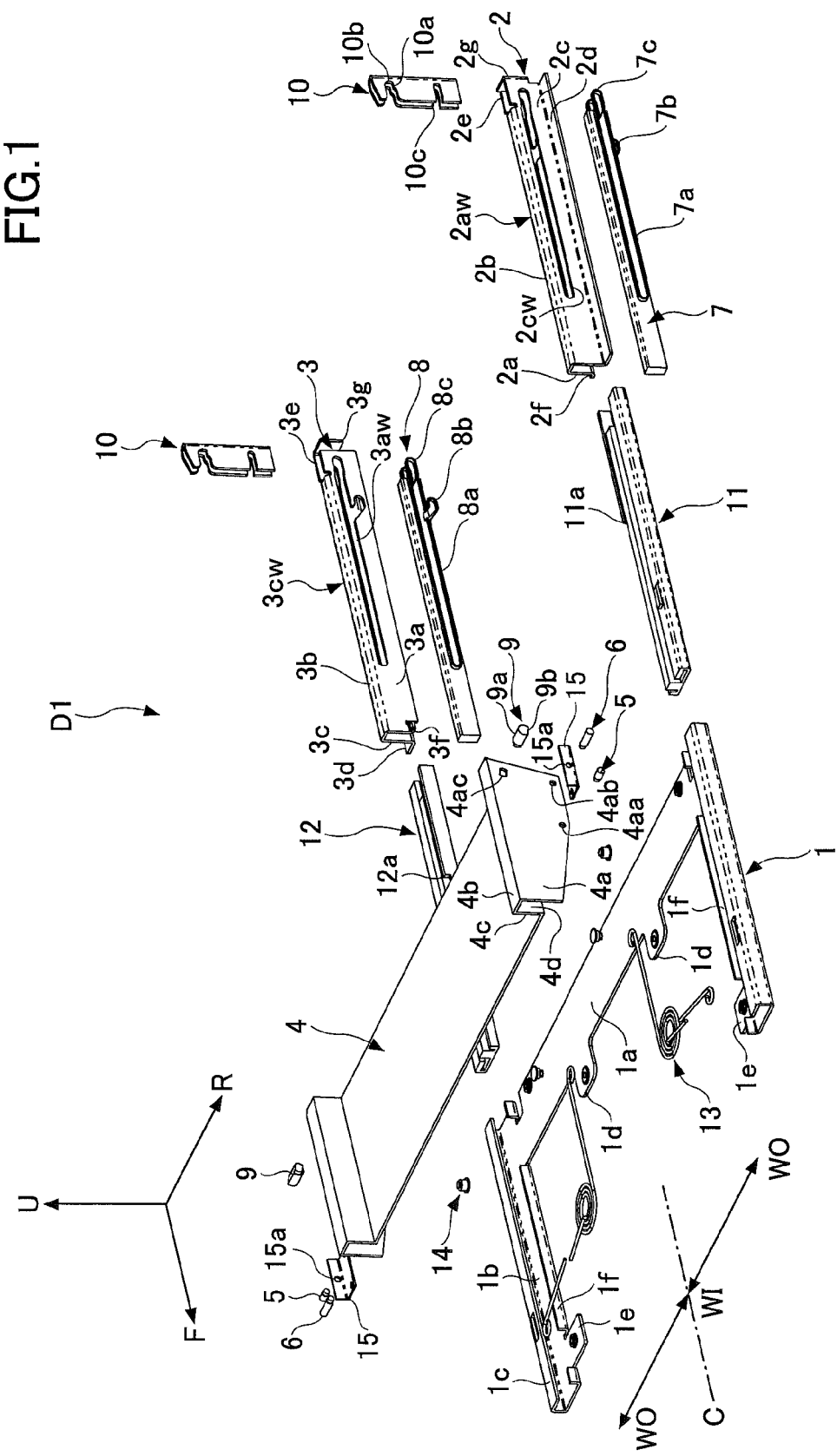
FIG. 1 is an exploded perspective view of a sliding device for an electronic apparatus that is an embodiment of the present invention.

S electronic apparatus
D1 sliding device for an electronic apparatus
1 base plate (base plate)
1a flat surface part
1b side part
1c base guide holder
1d spring receiving part
1e lug part
2 slider (intermediate plate: right)
2a interior side surface part
2aw opening part
2b top surface part
2c exterior side surface part
2cw opening part
2d outer side edge part
2e fitting part
3 slider (intermediate plate: left)
3a interior side surface part
3aw opening part
3b top surface part
3c exterior side surface part
3cw opening part
3d outer side edge part
3e fitting part
4 sliding plate (sliding plate)
4a outward oriented surface part
4b top surface part
4c inward oriented surface part
4d rectangular groove-shaped space
5 sliding pin (first projecting part)
6 sliding pin (second projecting part)
7 slider guide (guide body; right)
7a guide part (right)
7b branch guide part (right)
7c end portion guide part (right)
8 slider guide (guide body; left)
8a guide part (left)
8b branch guide part (left)
8c end portion guide part (left)
9 lock pin (contact piece)
9a partially cylindrical surface
9b connecting surface
10 stopper (contacted piece)
10a contacted shape part
10b engaged shape part
10c end portion guide corresponding groove
11 base guide (slid part: right)
12 base guide (slid part: left)
13 spring
14 spring pin
15 plate

DESCRIPTION OF EMBODIMENTS

A description is given below, with reference to the drawings, of an embodiment of the present invention.

In the drawings used for the description of the below-described embodiment, F indicates a front direction among the front and rear directions, U indicates a top direction (upward direction) among the top and bottom directions, and R indicates a rightward direction among the widthwise directions. In this embodiment, as illustrated in FIG. 1, there is a widthwise center C, and a direction toward the widthwise center C is referred to as the widthwise inside direction WI and a direction away from the widthwise center C is referred to as the widthwise outside direction WO.

Embodiment

As illustrated in FIG. 1 and FIGS. 2A through 2C, a sliding device for an electronic apparatus D1 according to this embodiment includes a base plate 1 (a base plate); a pair of right and left sliders 2 and 3 (intermediate plates: right and left) that are connected to the base plate 1 via first sliding mechanisms so as to be slidable in the front and the rear direction of the base plate 1; and a sliding plate 4 (a sliding plate) connected to the pair of the right and left sliders 2 and 3 via second sliding mechanisms so as to be slidable in the front and the rear direction.

The latter second sliding mechanisms include a pair of substantially columnar sliding pins 5 (a first projecting part) in the widthwise directions that project from the sliding plate 4 toward the widthwise outside of the base plate 1; and a pair of sliding pins 6 (a second projecting part) that are positioned on the rear direction side in the front and the rear direction relative to the sliding pins 5 and project further toward the widthwise outside than the sliding pins 5.

Further, the second sliding mechanism on the right side includes a guide part 7a that guides both the sliding pin 5 and the sliding pin 6 in the front and the rear direction; a branch guide part 7b that branches off from a widthwise inside portion of the guide part 7a with which only the sliding pin 5 comes into contact toward the rear direction side in the front and the rear direction and toward the bottom direction side in the top and the bottom direction of the base plate 1; and an end portion guide part 7c that is positioned on the rear direction side of a widthwise outside portion with which only the sliding pin 6 comes into contact, the widthwise outside portion being a portion of the guide part 7a other than the widthwise inside portion.

Likewise, the second sliding mechanism on the left side includes a guide part 8a that guides the sliding pin 5 and the sliding pin 6 in the front and the rear direction; a branch guide part 8b that branches off from a widthwise inside portion of the guide part 8a with which the sliding pin 5 comes into contact toward the rear direction side in the front and the rear direction and toward the bottom direction side in the top and the bottom direction of the base plate 1; and an end portion guide part 8c that is positioned on the rear direction side of a widthwise outside portion of the guide part 8a other than the widthwise inside portion.

Further, the second sliding mechanisms include lock pins 9 (contact pieces) that are positioned on the rear direction side and the top direction side in the top and the bottom direction of the sliding pins 6 and project from the sliding plate 4 toward the widthwise outside; and stoppers 10 (contacted parts) with which the lock pins 9 come into contact when the sliding plate 4 is caused to slide with maximum displacement in the rear direction relative to the base plate 1.

The lock pins 9 (contact pieces) are formed into an arc pillar shape, that is, a D-cut shape, including a partially cylindrical surface 9a formed by projecting a partial arc having an angle larger than 180 degrees in a widthwise direction and a connecting flat surface 9b that connects both circumferential ends of the partially cylindrical surface 9a. Except the state where the sliding plate 4 is slid to a maximum limit in the rear direction, the normal of the connecting surface 9b is slightly inclined in the front direction relative to the bottom direction in FIG. 1, so that relative to the front and the rear directions, the connecting surface 9b has the rear direction end offset in the bottom direction relative to the front direction end.

The stoppers 10 are formed by bending a metal plate-shaped member, for example, blanked out by press working, along a mountain fold line and a valley fold line parallel to the top and the bottom direction. Each stopper 10 includes a contacted shape part 10a that is contacted by the rear-direction-side one of a pair of the front and rear boundary portions of the partially cylindrical surface 9a and the connecting surface 9b to provide a rotational force to move the front direction end portion of the sliding plate 4 in the bottom direction relative to its rear direction end portion to the sliding plate 4 via the lock pin 9.

Here, the boundary portion refers to a rear-direction-side ridgeline portion that forms the boundary between the partially cylindrical surface 9a and the connecting surface 9b. The contacted shape part 10a forms a curved or flat inclined plane that moves this ridgeline portion toward the top direction side to cause the connecting surface 9b to be parallel to the front and the rear direction when the ridgeline portion approaches from the front direction in FIG. 1 and contacts the contacted shape part 10a.

Further, each stopper 10 includes an engaged shape part 10b with which the lock pin 9 whose connecting surface 9b has been made parallel to the front and the rear direction is engaged. This engaged shape part 10b forms a recessed shape with which a projecting shape including the rear-direction-side portion of the partially cylindrical surface 9a and the rear-direction-side portion of the connecting surface 9b of the lock pin 9 is engaged.

Each of the branch guide part 7b and the end portion guide part 7c includes an arc portion that has a center at the engaged shape part 10b (technically, the instantaneous center of rotation of the lock pin 9 based on the contact of the contacted shape part 10a and the boundary portion illustrated in FIGS. 4A through 4E described below) in a view from the widthwise outside to extend in a circumferential direction, and further includes a linear portion extending parallel to the front and the rear direction from the rear direction end of the arc portion to the end portion. Likewise, each of the branch guide part 8b and the end portion guide part 8c includes an arc portion that has a center at the engaged shape part 10b in a view from the widthwise outside to extend in a circumferential direction, and further includes a linear portion extending parallel to the front and the rear direction from the rear direction end of the arc portion to the end portion.

The slider 2 is formed by bending, for example, a metal plate-shaped member along a mountain fold line and a valley fold line parallel to the front and the rear direction. The slider 2 includes an interior side surface part 2a that is perpendicular to the widthwise directions and positioned on the widthwise inside, a top surface part 2b that is perpendicular to the top and the bottom direction, an exterior side surface part 2c that is positioned on the widthwise outside relative to the interior side surface part 2a, and an outer side edge part 2d that projects on the widthwise outside of the exterior side surface part 2c.

Likewise, the slider 3 is formed by bending, for example, a metal plate-shaped member along a mountain fold line and a valley fold line parallel to the front and the rear direction. The slider 3 includes an interior side surface part 3a that is perpendicular to the widthwise directions and positioned on the widthwise inside, a top surface part 3b that is perpendicular to the top and the bottom direction, an exterior side surface part 3c that is positioned on the widthwise outside relative to the interior side surface part 3a, and an outer side edge part 3d that projects on the widthwise outside of the exterior side surface part 3c.

The stoppers 10 are fit to a fitting part 2e formed in a rear-direction-side end portion of the slider 2 and a fitting part 3e formed in a rear-direction-side end portion of the slider 3 so as to be fixed to the rear-direction-side end portions of the slider 2 and the slider 3. End portion guide part corresponding grooves 10c, which have the same shape as the end portion guide parts 7c and 8c when viewed in the widthwise directions, are formed in bottom-side portions of the stoppers 10 in the top and the bottom direction, so as to prevent the stoppers 10 from blocking the sliding operations of the sliding pins 6 after the fixation of the stoppers 10. Further, a bent part 2g perpendicular to the front and the rear direction is foisted on the rear direction side of the fitting part 2e in the slider 2, and a bent part 3g perpendicular to the front and the rear direction is formed on the rear direction side of the fitting part 3e in the slider 3.

This embodiment includes a slider guide 7 (a guide body: right) that has the guide part 7a, the branch guide part 7b, and the end portion guide part 7c on the right side formed as a unitary structure. The slider guide 7 is held and fixed between the interior side surface part 2a and the exterior side surface part 2c of the slider 2 based on means such as engagement or insert molding.

The slider 2 includes an opening part 2aw, through which the sliding pin 5 and the sliding pin 6 are inserted from the widthwise inside to the widthwise outside, in the interior side surface part 2a, and causes the sliding pin 5 and the sliding pin 6 on the right side to come into contact with the guide part 7a, the branch guide part 7b, and the end portion guide part 7c on the right side. Further, the exterior side surface part 2c of the slider 2 includes an opening part 2cw for causing a widthwise outside end portion of the sliding pin 6 to project toward the widthwise outside.

Likewise, this embodiment includes a slider guide 8 (a guide body: left) that has the guide part 8a, the branch guide part 8b, and the end portion guide part 8c on the left side formed as a unitary structure. The slider guide 8 is held and fixed between the interior side surface part 3a and the exterior side surface part 3c of the slider 3 based on means such as engagement or insert molding.

The slider 3 includes an opening part Saw, through which the sliding pin 5 and the sliding pin 6 are inserted from the widthwise inside to the widthwise outside, in the interior side surface part 3a, and causes the sliding pin 5 and the sliding pin 6 on the left side to come into contact with the guide part 8a, the branch guide part 8b, and the end portion guide part 8c on the left side. Further, the exterior side surface part 3c of the slider 3 includes an opening part 3cw for causing a widthwise outside end portion of the sliding pin 6 to project toward the widthwise outside.

Figure 2A:
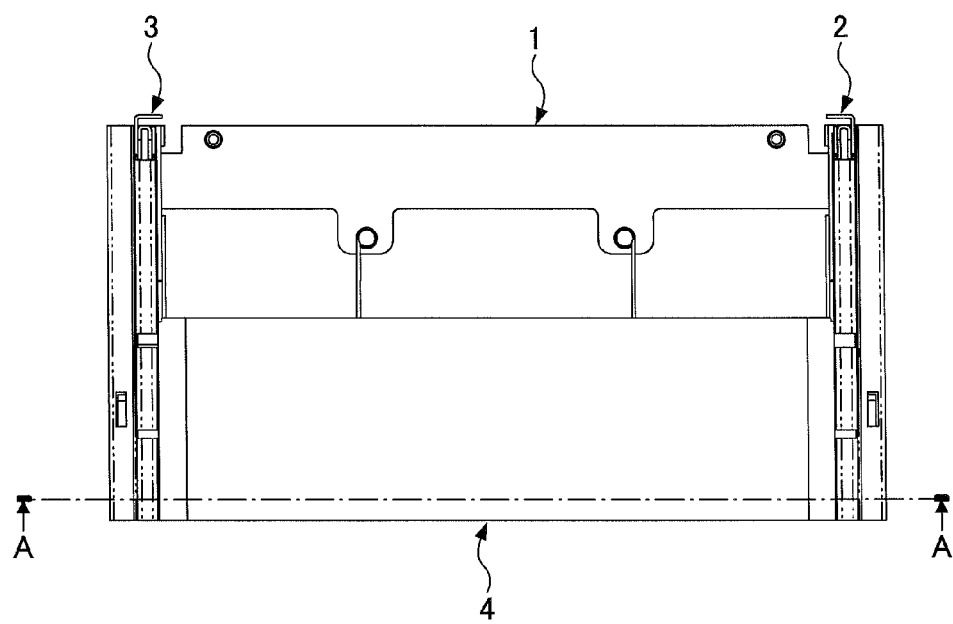
FIG. 2A is a plan view of the sliding device for an electronic apparatus that is an embodiment of the present invention.
Figure 2B:
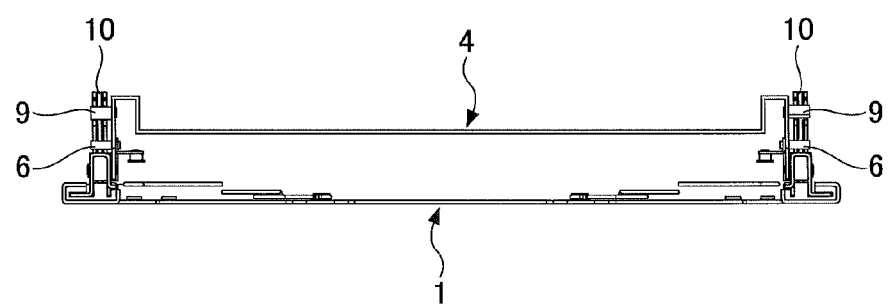
FIG. 2B is a front view of the sliding device for an electronic apparatus that is an embodiment of the present invention.
Figure 2C:
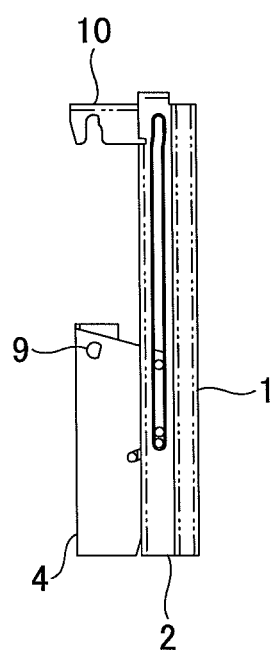
FIG. 2C is a side view of the sliding device for an electronic apparatus that is an embodiment of the present invention.

As illustrated in FIG. 2D, which illustrates a cross section of the sliding device for an electronic apparatus D1 taken along line A-A in FIG. 2A, the first sliding mechanism on the right side (including the slider 2 and a base guide 11) includes, as a sliding part, a top surface 2$d$U and a bottom surface 2$d$D of the outer side edge part 2$d$ perpendicular to the top and the bottom direction, a widthwise inside interior surface 2$c$I of a portion of the exterior side surface part 2$c$ positioned in the bottom direction relative to the guide part 7$a$, the interior surface 2$c$I being perpendicular to the widthwise directions, and an exterior surface 2$a$O of a portion of the interior side surface part 2$a$ positioned on the bottom direction side of the guide part 7$a$ (the slider guide 7), the exterior surface 2$a$O being perpendicular to the widthwise directions.

In addition, as illustrated on the right side in FIG. 2D, the base guide 11 of this right-side first sliding mechanism forms a slid part having a slid surface shape that corresponds to and comes into contact with only the sliding part. This base guide 11 is fixed to a right end portion of the base plate 1. That is, a widthwise outside end surface of the outer side edge part 2$d$ and a bottom-direction-side end surface of the interior side surface part 2$a$ have respective gaps in a plane direction and do not slide relative to the base guide 11.

As illustrated on the left side of FIG. 2D, the first sliding mechanism on the left side (including the slider 3 and a base guide 12) as well includes, as a sliding part, a top surface 3$d$U and a bottom surface 3$d$D of the outer side edge part 3$d$ perpendicular to the top and the bottom direction, a widthwise inside interior surface 3$c$I of a portion of the exterior side surface part 3$c$ positioned in the bottom direction relative to the guide part 8$a$, the interior surface 3$c$I being perpendicular to the widthwise directions, and an exterior surface 3$a$O of a portion of the interior side surface part 3$a$ positioned on the bottom direction side of the guide part 8$a$, the exterior surface 3$a$O being perpendicular to the widthwise directions.

Further, as illustrated on the left side in FIG. 2D, the base guide 12 of this left-side first sliding mechanism forms a slid part having a slid surface shape that corresponds to the sliding part. This base guide 12 is fixed to a left end portion of the base plate 1. Here as well, a widthwise outside end surface of the outer side edge part 3$d$ and a bottom-direction-side end surface of the interior side surface part 3$a$ do not slide relative to the base guide 12.

The sliding plate 4 is formed by performing press working and bending on a metal plate material, and includes a pair of outward oriented surface parts 4$a$ that are oriented outward in the widthwise directions. The outward oriented surface parts 4$a$ are provided with the sliding pins 5, the sliding pins 6, and the lock pins 9. Circular hole parts 4$aa$ and 4$ab$ into which widthwise inside end portions of the sliding pins 5 and the sliding pins 6 are fit by caulking and quadrangular hole parts 4$ac$ into which widthwise inside end portions of the lock pins 9 are fit by caulking are formed in the outward oriented surface parts 4$a$.

The sliding plate 4 includes top surface parts 4$b$ that adjoin to the outward oriented surface parts 4$a$ on their widthwise inside and are perpendicular to the top and the bottom direction, and inward oriented surface parts 4$c$ that adjoin to the top surface parts 4$b$ on their widthwise inside and are perpendicular to the widthwise directions. The inward oriented surface parts 4$c$, the top surface parts 4$b$, and the outward oriented surface parts 4$a$ define rectangular groove-shaped spaces 4$d$ that are through in the front and the rear direction. These rectangular groove-shaped spaces 4$d$ may be suitably used for routing interconnects such as an FPC and harness. The outward oriented surface parts 4$a$ are shaped to have respective cut surfaces that are gradually reduced in length in the top and the bottom direction from the rear direction toward the front direction.

The base plate 1 is formed by performing press working and bending on a metal plate material, and includes a rectangular flat surface part 1$a$, which is longer in the widthwise directions than in the front and the rear direction, around the widthwise center. Side parts 1$b$, which are positioned on the widthwise outside relative to the flat surface part 1$a$ of the base plate 1, are once bent perpendicularly toward the top direction to be directed toward the top direction for substantially as much thickness as the thickness of the base guides 11 and 12, and is thereafter bent again toward the widthwise inside, so that base guide holders 1$c$ are formed.

A pair of right and left spring receiving parts 1$d$ are formed on a front-direction-side end portion of the flat surface part 1$a$ to project in the front direction. Lug parts 1$e$ that project toward the widthwise inside are formed on the side parts 1$b$ on the front direction side. Except for portions on which the lug parts 1$e$ are formed and portions that communicate with the flat surface part 1$a$, the side parts 1$b$ are bent to be directed toward the top direction for a length slightly shorter than the thickness of the base guides 11 and 12 to form inner wall parts 1$f$.

In this embodiment, the base guides 11 and 12 are joined, by suitable means such as engagement or insert molding, to and held by portions defined on the widthwise inside of the paired right and left base guide holders 1$c$ and the widthwise outside of the inner wall parts 1$f$. The base guides 11 and 12 are formed of, for example, resin such as polyacetal for good lubricity relative to the above-described sliding parts of the sliders 2 and 3. A rear stopper 11$a$ included in the base guide 11 and a rear stopper 12$a$ included in the base guide 12 are caused to come into contact with a rear stopper 2$f$ included in the slider 2 and a rear stopper 3$f$ included in the slider 3 at the time of sliding in the rear direction.

In addition, the sliding device for an electronic apparatus D1 of this embodiment includes springs 13 that generate an operational reaction force and an urging force and spring pins 14 for attaching the springs 13. In connecting the springs 13 to the sliding plate 4 side, plates 15 whose cross sections in the front and the rear direction have an L-letter shape are used.

The plates 15 have respective flat plate parts perpendicular to the top and the bottom direction and respective side surface parts perpendicular to the widthwise directions. The side plate parts are fixed to the outward oriented surface parts 4$a$ of the sliding plate 4 by fitting the widthwise inside end portions of the sliding pins 6 into holes 15$a$ provided in the side plate parts 15 by caulking and fitting the widthwise inside end portions of the sliding pins 6 into the holes 4$ab$ of the outward oriented surface parts 4$a$ by caulking.

Holes for fitting the spring pins 14 are provided in the flat plate parts of the plates 15. By fitting the spring pins 14 inserted through end portions of the springs 13 into these holes, the end portions of the springs 13 are connected to the sliding plate 4 side. End portions of the springs 13 on the other side are connected to the base plate 1 side by fitting the spring pins 14 inserted through the end portions on the other side into holes provided in the spring receiving parts 1$d$ of the base plate 1.

Taps are formed at four points—front, rear, right, and left—in the base plate 1. Screws, not graphically illustrated, inserted through holes, not graphically illustrated, formed on the side of a main body part BD of an electronic apparatus S illustrated in FIGS. 3A through 3E are fastened to these taps, thereby fixing the base plate 1 to the main body part BD. Taps, not graphically illustrated, are fanned at multiple points in the sliding plate 4 as well. Screws, not graphically illustrated, inserted through holes, not graphically illustrated, formed on the side of sub body part BU of the electronic apparatus S are fastened to these taps, thereby fixing the sliding plate 4 to the sub body part BU.

The front direction in the front and the rear direction illustrated in FIG. 1 is a direction toward a closed position where the sub body part BU completely overlaps the main body part BD in the front and the rear direction as illustrated in FIGS. 3A through 3D, and is a direction toward a user during use of the electronic apparatus S including the sliding device for an electronic apparatus D1 by the user.

Figure 3A:
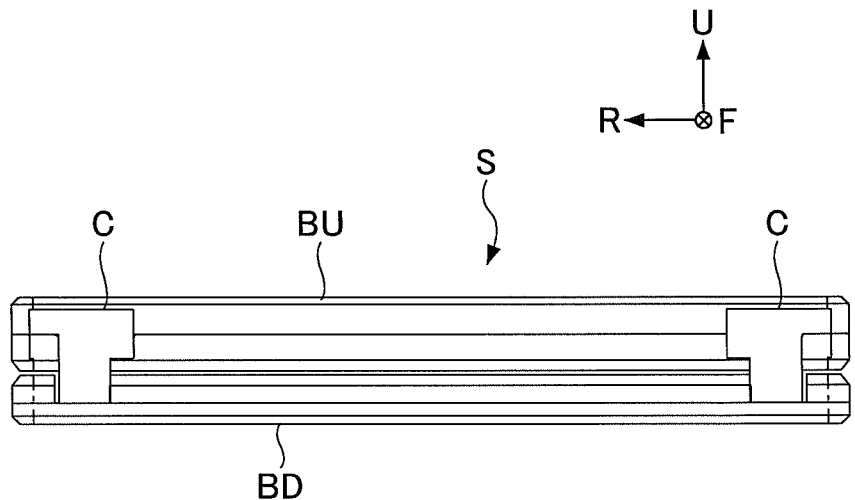
FIG. 3A is a rear view of an electronic apparatus to which the sliding device for an electronic apparatus that is an embodiment of the present invention is applied.
Figure 3B:
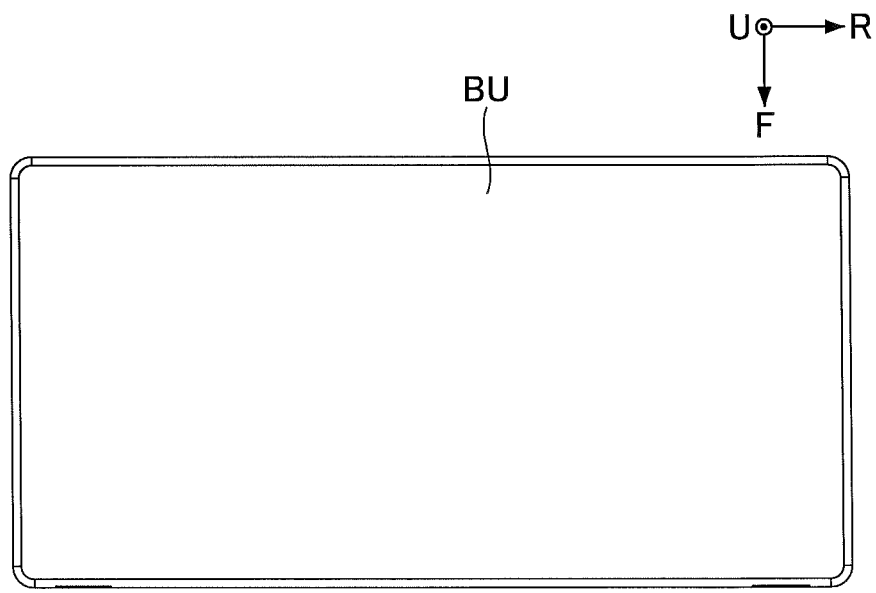
FIG. 3B is a plan view of the electronic apparatus to which the sliding device for an electronic apparatus that is an embodiment of the present invention is applied.
Figure 3C:
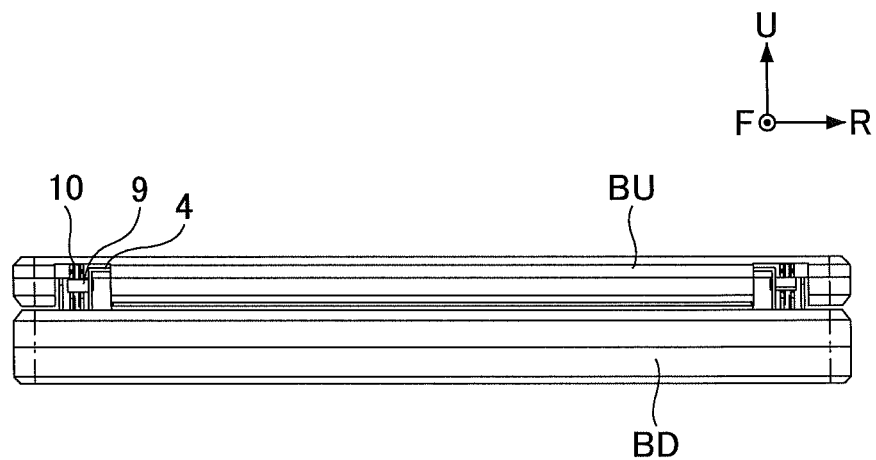
FIG. 3C is a front view of the electronic apparatus to which the sliding device for an electronic apparatus that is an embodiment of the present invention is applied.
Figure 3D:
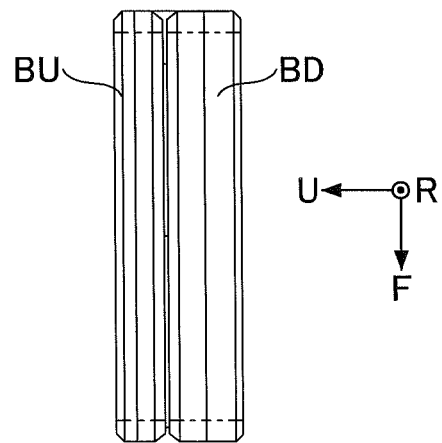
FIG. 3D is a side view of the electronic apparatus to which the sliding device for an electronic apparatus that is an embodiment of the present invention is applied.
Figure 3E:
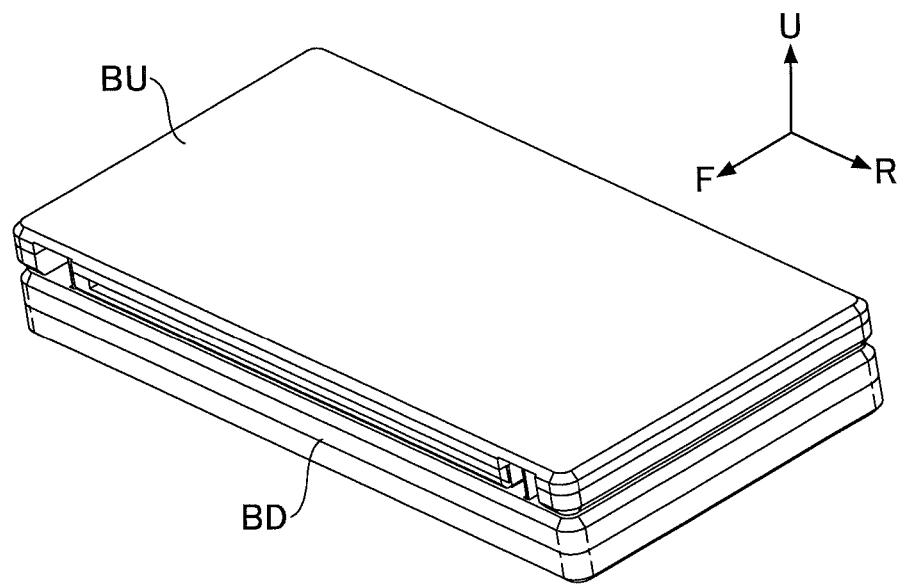
FIG. 3E is a perspective view of the electronic apparatus to which the sliding device for an electronic apparatus that is an embodiment of the present invention is applied.

As illustrated in FIG. 3A, the electronic apparatus S is provided with covers C that have a T-letter shape over the main body part BD and the sub body part BU. These covers C are fixed to the bent part 2g of the slider 2 and the bent part 3g of the slider 3 illustrated in FIG. 1, and move in the front and the rear direction with the sliding of the sliders 2 and 3 in the front and the rear direction to suitably hide the first sliding mechanisms and the second sliding mechanisms from outside, thereby improving design.

Next, a description is given of a sliding operation of the sliding device for an electronic apparatus D1 of this embodiment. As illustrated in FIGS. 4A through 4E, when the sliding plate 4 transitions from a closed state illustrated in FIG. 4A to an open state illustrated in FIG. 4E, of a sliding operation of the first sliding mechanisms and a sliding operation of the second sliding mechanisms, the sliding operation by the first sliding mechanisms is performed first.

That is, after first causing the slider 2 and the slider 3 to slide in the rear direction relative to the base plate 1, the sliding plate 4 is caused to slide in the rear direction relative to the sliders 2 and 3. As means for determining this order, for example, a magnet or a click mechanism may be included that restricts the relationship between the relative positions of the sliding plate 4 and the sliders 2 and 3 in the front and the rear direction.

Figure 4A:
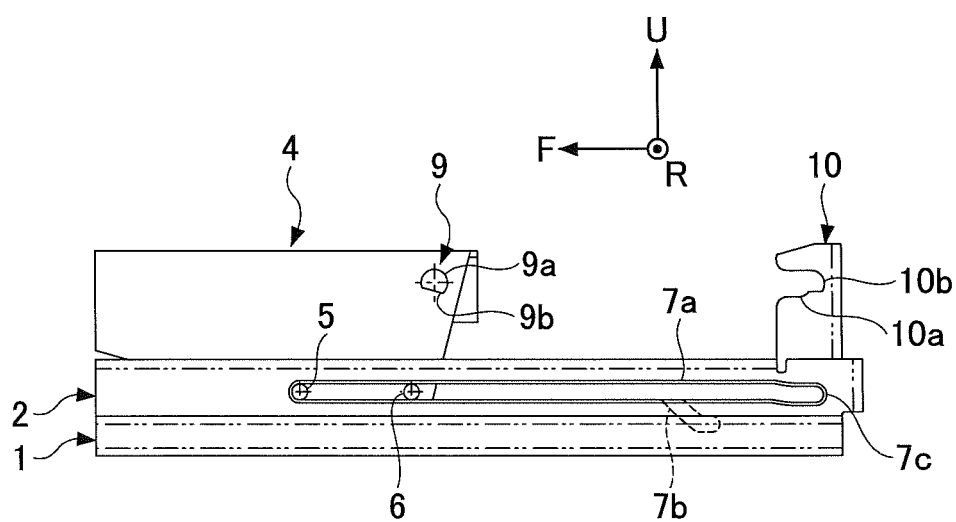
FIG. 4A is a diagram for illustrating an operation of the sliding device for an electronic apparatus that is an embodiment of the present invention, illustrating a state where a sliding plate is positioned in a closed state.
Figure 4B:
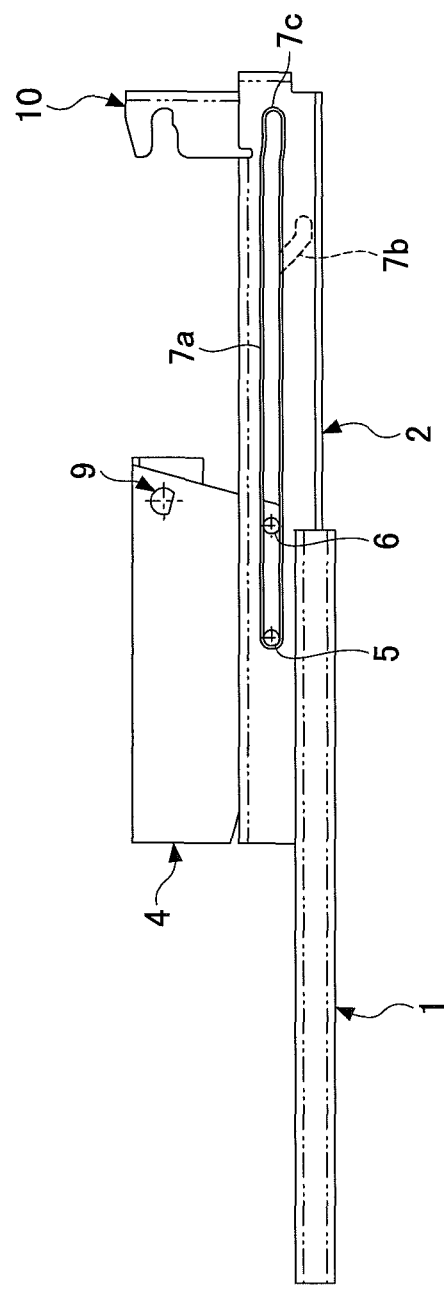
FIG. 4B is a (first) diagram for illustrating an operation of the sliding device for an electronic apparatus that is an embodiment of the present invention, illustrating a state where the sliding plate is in motion.
Figure 4D:
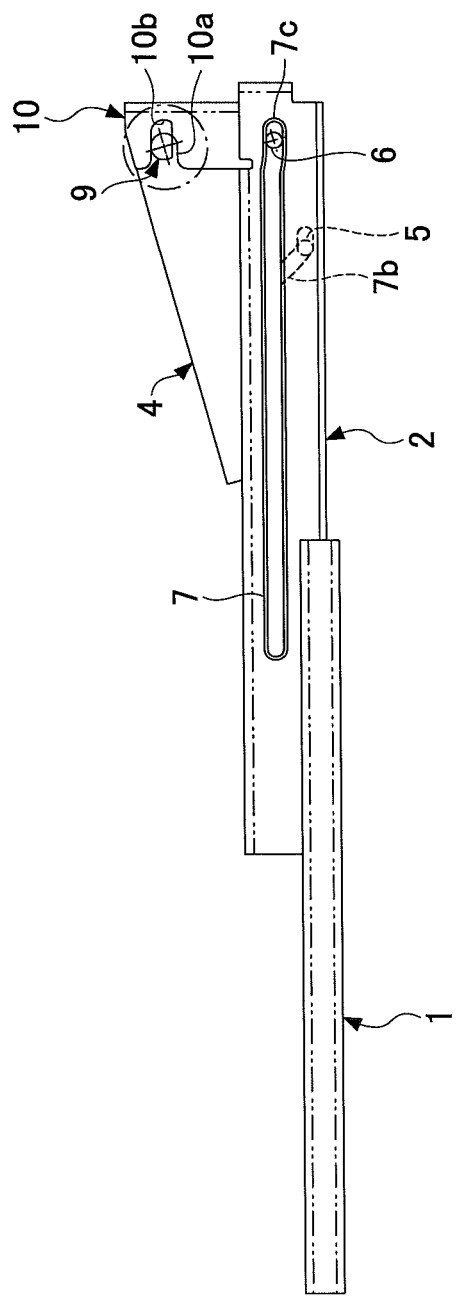
FIG. 4D is a (third) diagram for illustrating the operation of the sliding device for an electronic apparatus that is an embodiment of the present invention, illustrating a state where the sliding plate is in motion.
Figure 4E:
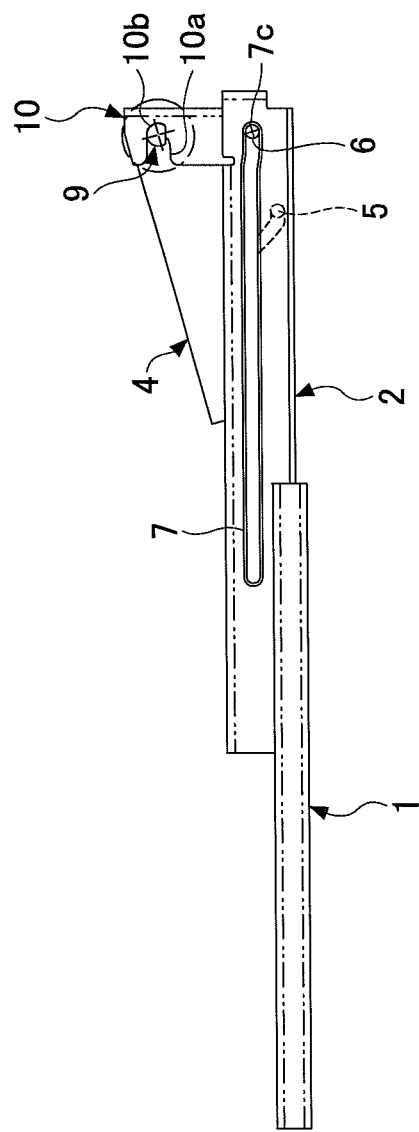
FIG. 4E is a diagram for illustrating the operation of the sliding device for an electronic apparatus that is an embodiment of the present invention, illustrating a state where the sliding plate is positioned in an open state.

In the sliding device for an electronic apparatus D1 of this embodiment, in the transition from the closed state illustrated in FIG. 4A to the open state illustrated in FIG. 4E, an operational reaction force is provided against a user's operating force until an intermediate state illustrated in FIG. 4B and an assisting force is provided to a user's operating force after this intermediate state with the springs 13. Further, a holding force to hold the open state unless an operating force is input in the open state is caused to act by the springs 13.

In this embodiment, the assisting force generated by these springs 13 is used as a force to cause the sliding plate 4 to have its front end portion side move in the bottom direction and to tilt about the widthwise directions. That is, after going through the intermediate state illustrated in FIG. 4B, the sliding plate 4 starts to slide in the rear direction relative to the sliders 2 and 3.

Then, as illustrated in FIG. 4C, the boundary part of the connecting surface 9b, which has its rear direction end tilted in the bottom direction relative to the front and the rear direction before contact, and the partially cylindrical surface 9a comes into contact with the contacted shape part 10a of the stopper 10 based on the above-described assisting force, so that the boundary part is pressed and caused to move in the top direction by an inclined surface of the contacted shape part 10a, which rises more in the top direction toward the rear direction.

This acts to cause a moment rotated counterclockwise in FIG. 4C to be generated in the lock pin 9, so that the lock pin 9 and the slide plate 4 connected to the lock pin 9 are caused to rotate counterclockwise in FIG. 4C. Further, the sliding pin 5 enters the arc portion of the branch guide part 7b (8b on the left side) and the sliding pin 6 enters the arc portion of the end portion guide part 7c (8c on the left side), so that a front end portion of the sliding plate 4 is caused to move in the bottom direction relative to a rear end portion. As a result, the state illustrated in FIG. 4D is entered, and the connecting surface 9b becomes parallel to the front and the rear direction.

The assisting force due to the springs 13 continues to act, so that from the state illustrated in FIG. 4D, the lock pin 9 further moves in the rear direction while having its connecting surface 9b supported by a surface of the engaged shape part 10b of the stopper 10, which surface is parallel to the front and the rear direction and perpendicular to the top and the bottom direction.

Then, as illustrated in FIG. 4E, the lock pin 9 is engaged with the engaged shape part 10b, and the sliding pin 5 moves through the linear portion of the branch guide part 7b to come into contact with its end portion and the sliding pin 6 moves through the linear portion of the end portion guide part 7c to come into contact with its end portion. As a result, the open state is entered with the rotation of the lock pin 9 and the sliding plate 4 about the center of the engaged shape part 10b being locked.

A supplementary description is given, using FIGS. 5A through 5F, of the relative positional relationship between components of this embodiment in the open state illustrated in FIG. 4E.

Figure 5A:
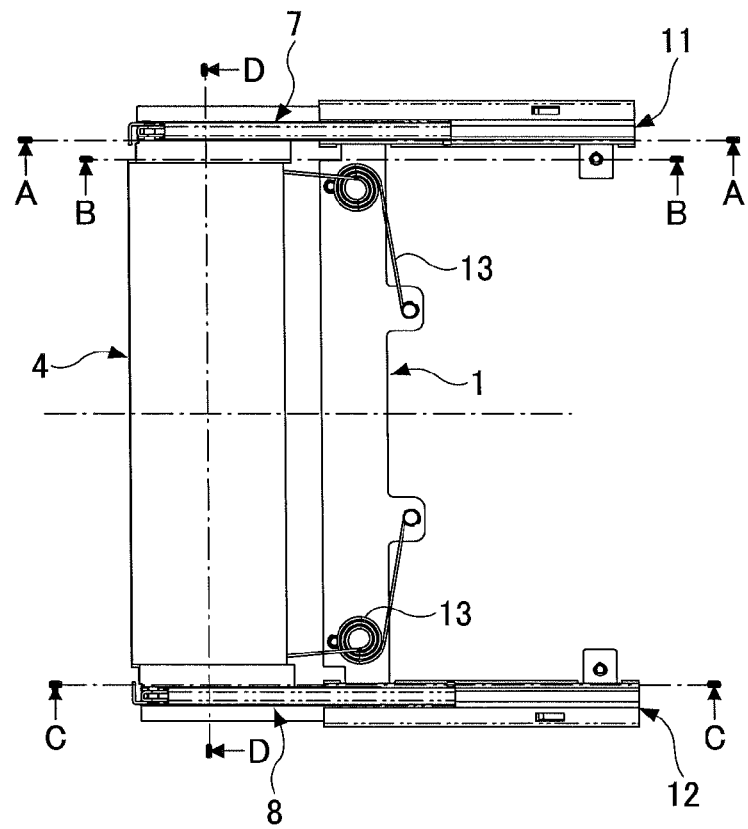
FIG. 5A is a plan view of the sliding device for an electronic apparatus that is an embodiment of the present invention in the open state.
Figure 5B:
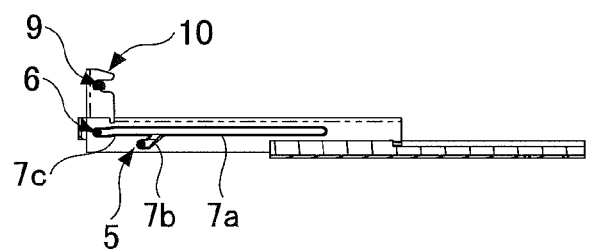
FIG. 5B is a cross-sectional view taken along line A-A in FIG. 5A.
Figure 5C:
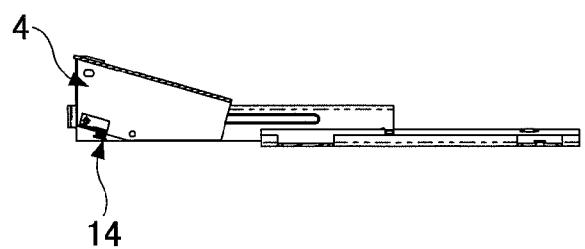
FIG. 5C is a cross-sectional view taken along line B-B in FIG. 5A.
Figure 5D:
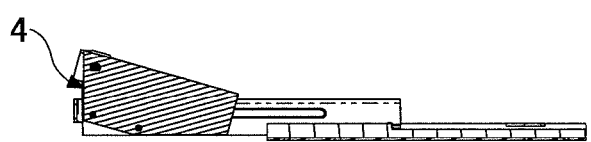
FIG. 5D is a cross-sectional view taken along line C-C in FIG. 5A.
Figure 5E:
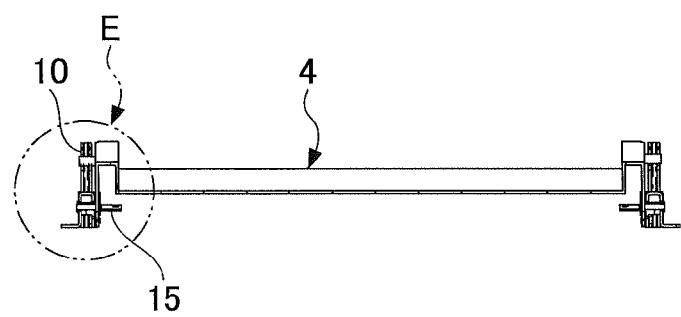
FIG. 5E is a cross-sectional view taken along line D-D in FIG. 5A.
Figure 5F:
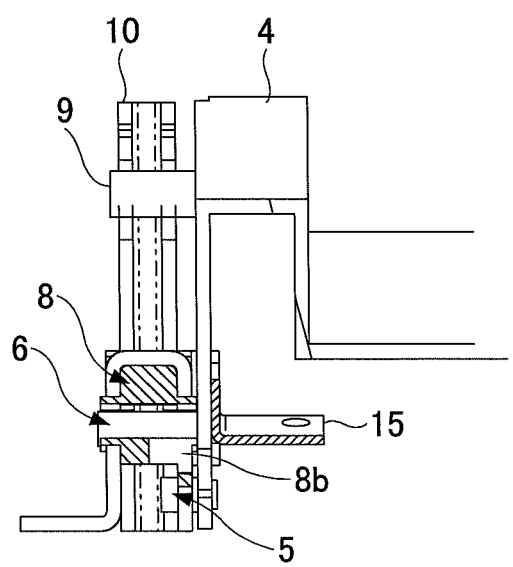
FIG. 5F is a detail diagram of a part indicated by arrow E in FIG. 5E.

As illustrated in FIG. 5B, in the open state, the lock pin 9 is completely engaged with the engaged shape part 10b of the stopper 10, and the sliding pin 5 is in contact with the end portion of the branch guide part 7b and the sliding pin 6 is in contact with the end portion of the end portion guide part 7c. In this closed state, the sliding pin 5 is moved in the bottom direction relative to the sliding pin 6, so that the front end portion of the sliding plate 4 is moved in the bottom direction to have the above-described cut surface become parallel to the front and the rear direction.

At this point, as illustrated in FIGS. 5B through 5F, the end portions of the springs 13 connected to the sliding plate 4, the spring pins 14, and the plates 15 have respective front end portions moved in the bottom direction relative to respective rear end portions to be inclined relative to the front and the rear direction. The length of the plates 15 in the front and the rear direction is caused to be a minimum limit length for attachment of the spring pins 14, thereby controlling the displacement of the connecting points of the springs 13 due to the inclination of the plates 15 as much as possible.

In a transition from the open state illustrated in FIG. 4E to the closed state illustrated in FIG. 4A, first, an operating force to cause the sliding plate 4 to move in the front direction is provided by a user, so that the sliding pins 5 move through the linear portions of the branch guide parts 7b and 8b backward in the front direction and the sliding pins 6 move through the linear portions of the end portion guide parts 7c and 8c backward in the front direction, thus making a transition to the state illustrated in FIG. 4D. Then, when a lifting force to cause the front end portion of the sliding plate 4 to move from the bottom direction to the top direction is provided after disengagement of the lock pins 9 from the engaged shape parts 10b, the sliding pins 5 move through the arc portions of the branch guide parts 7b and 8b backward in the front direction and the sliding pins 6 move through the arc portions of the end portion guide parts 7c and 8c backward in the front direction, thus making a transition to the state illustrated in FIG. 4C.

After the transition to the state illustrated in FIG. 4C, either of a sliding operation of the first sliding mechanisms and a sliding operation of the second sliding mechanisms may be performed first. In the sliding device for an electronic apparatus D1 of this embodiment, in the transition from the open state to the closed state as well, an operational reaction force is provided against a user's operating force until the middle and an assisting force is provided to a user's operation after the middle with the springs 13. Further, a holding force to hold the closed state unless an operating force is input in the closed state is caused to act by the springs 13.

According to the above-described sliding device for an electronic apparatus, D1 and electronic apparatus S including the sliding device for an electronic apparatus D1 of this embodiment, the following effects may be obtained. That is, in the case of causing the sliding plate 4 and the sub body part BU fixed to the sliding plate 4 to slide in the rear direction, it is possible to cause the lock pins 9 to automatically come into contact with the stoppers 10 using the assisting force generated by the springs 13 in the latter half of sliding, and to tilt the sliding plate 4 and the sub body part BU using the moment generated by this contact.

That is, a user is required to perform a sliding operation and a tilting operation as separate operations according to conventional techniques, while according to this embodiment, including a sliding operation and a tilting operation in an opening operation sequence, it is possible for a user to cause the tilting operation to be automatically performed on the sliding device for an electronic apparatus D1 side by performing only the sliding operation.

Further, by causing the lock pins 9 to engage with the engaged shape parts 10b of the stoppers 10 by making further use of the above-described assisting force after the automatic performance of the tilting operation, it is also possible to automatically prevent and lock the rotation of the sliding plate 4 about the widthwise directions after the end of the tilting operation.

By automatically performing these tilting and locking operations in association with a sliding operation on the sliding device for an electronic apparatus D1 side, it is possible to achieve and improve both user's convenience and operability by causing the tilting operation and the locking operation, which are separate operations according to conventional techniques, to be operations automatically performed in association with the sliding operation.

Further, it is possible to improve design by causing a front end portion of the sub body part BU fixed to the sliding plate 4 to move in the bottom direction and drop relative to a rear end portion by the tilting operation and thereby causing the positions of the front end portion of the sub body part BU and a rear end portion of the main body part BD to match in the top and the bottom direction. Further, when the sub body part BU includes, for example, a display, it is possible to improve visibility by automatically selecting an angle that makes the display easily viewable for a user with the sub body part BU being inclined relative to the main body part BD.

In addition, in re-selecting the open state after selecting the closed state, the operation of releasing the lock pins 9 from the stoppers 10 is a one-touch operation that causes the sub body part BU to slightly move in the front direction, and the operation of returning the sliding pins 5 from the branch guide parts 7b and 8b to the guide parts 7a and 8a is a one-touch operation that causes the sub body part BU to slightly move in the top direction. Therefore, for example, by performing the former one-touch operation with the middle finger and the latter one-touch operation with the index finger, it is possible to simplify a releasing operation as well and thereby to make it easier to perform operations with a single hand.

Further, according to conventional techniques, a hinge mechanism is necessary to achieve the tilting operation and it is necessary to cause the hinge mechanism itself to slide in the front and the rear direction. Therefore, according to conventional techniques, achieving the tilting operation is likely to increase the backlash of the sub body part BU. According to this embodiment, however, a moment necessary for the tilting operation is generated only when the lock pins 9 and the stopper 10 come into contact at the last stage of sliding, so that a configuration corresponding to the hinge mechanism is implemented only at the last stage of sliding. Therefore, it is possible to prevent occurrence of the backlash of the sub body part BU about the widthwise directions and the top and the bottom direction as much as possible.

In addition to this, in this embodiment, the slider 2 and the slider 3 are formed by bending a flat plate based on fold lines parallel to the front and the rear directions as described above. With respect to surfaces perpendicular to the top and the bottom direction, the top surface and the bottom surface are determined as sliding surfaces and with respect to surfaces perpendicular to the widthwise directions, the exterior surface or the interior surface is determined as a sliding surface, and the sliding surfaces are caused to come into contact with corresponding slid surfaces. Therefore, it is also possible to prevent occurrence of a backlash between the base plate 1 and the sliders 2 and 3 as much as possible by causing a restraining force to be generated in both the widthwise directions and the top and the bottom direction.

Further, of the surfaces of the sliders 2 and 3, with respect to those perpendicular to the top and the bottom direction, only the top surface and the bottom surface are caused to be sliding surfaces, and with respect to those perpendicular to the widthwise directions, only the exterior surface or the interior surface is caused to be a sliding surface. Thus, an end surface of a flat plate, which is generally low in surface accuracy, is not used as a sliding surface. Accordingly, the sliding operation itself is made smoother. This also makes it possible to reduce the abrasion of the slider guides 7 and 8 due to repeated operations and thereby to prevent a backlash.

Further, in this embodiment, the first sliding mechanisms and the second sliding mechanisms are used in combination. Therefore, it is possible to ensure user's convenience by ensuring a desired area for the exposed surface of the main body part BD in the open state, that is, the extended state, and also to ensure operability by ensuring the stability of the sub body part BU. That is, by achieving both of them, it is possible to improve product quality.

While a detailed description is given above of a preferred embodiment of the present invention, the present invention is not limited to the above-described embodiment, and variations and replacements may be added to the above-described embodiment without departing from the scope of the present invention.

INDUSTRIAL APPLICABILITY

According to the present invention, it is possible to provide a sliding device for an electronic apparatus that can improve product quality by achieving both convenience and operability and improving visibility and design. Therefore, the present invention is useful when applied to various types of electronic apparatuses that include a sub body part that is movable in a direction of movement relative to a main body part.

The present international application claims the benefit of priority based on Japanese Patent Application No. 2010-193216, filed on Aug. 31, 2010, the entire contents of which are incorporated herein by reference.

The invention claimed is:

1. A sliding device for an electronic apparatus, comprising:
a base plate;
a pair of intermediate plates connected to the base plate via first sliding mechanisms so as to be slidable in front and rear directions of the base plate; and
a sliding plate connected to the pair of intermediate plates via second sliding mechanisms so as to be slidable in the front and rear directions,
wherein each of the second sliding mechanisms includes
a first projecting part projecting outward in a widthwise direction of the base plate from the sliding plate;
a second projecting part positioned on a rear direction side of the first projecting part in the front and rear directions and projecting further outward in the widthwise direction than the first projecting part;
a guide part configured to guide the first projecting part and the second projecting part in the front and rear directions;
a branch guide part branching off from a widthwise inside portion of the guide part with which the first projecting part is in contact toward a rear direction side in the front and rear directions and a bottom direction side in top and bottom directions of the base plate;
an end portion guide part positioned on the rear direction side of a portion of the guide part other than the widthwise inside portion;
a contact piece positioned on the rear direction side and a top direction side in the top and bottom directions of the second projecting part and projecting outward in the widthwise direction from the sliding plate; and
a contacted part with which the contact piece is caused to come into contact when the sliding plate is caused to slide with a maximum displacement in the rear direction relative to the base plate;
wherein the contact piece includes a partially cylindrical surface and a connecting surface connecting both circumferential ends of the partially cylindrical surface, and the contacted part includes a contacted shape part configured to be contacted by a boundary part of the partially cylindrical surface and the connecting surface to provide the sliding plate with a rotational force to cause a front direction end portion of the sliding plate to move in the bottom direction relative to a rear direction end portion of the sliding plate, and an engaged shape part with which the partially cylindrical surface and the connecting surface are caused to engage.

2. The sliding device for an electronic apparatus as claimed in claim 1, wherein each of the branch guide part and the end portion guide part includes an arc portion having a center at the engaged shape part in a view from outside in the widthwise direction to extend in a circumferential direction, and a linear portion extending from the arc portion in the rear direction.

3. The sliding device for an electronic apparatus as claimed in claim 1, wherein each of the intermediate plates is formed by bending a plate-shaped material along a mountain fold line and a valley fold line parallel to the front and rear directions, and includes
an interior side surface part perpendicular to the widthwise direction and positioned inside in the widthwise direction;
a top surface part perpendicular to the top and bottom directions;
an exterior side surface part positioned outside in the widthwise direction relative to the interior side surface part; and
an outer side edge part projecting outward in the widthwise direction on the exterior side surface part.

4. The sliding device for an electronic apparatus as claimed in claim 1, wherein each of the first sliding mechanisms includes, as a sliding part,
a top surface and a bottom surface of the outer side edge part perpendicular to the top and bottom directions; an interior surface of a portion of the exterior side surface part positioned in the bottom direction relative to the guide part, the interior surface being perpendicular to the widthwise direction; and an exterior surface of a portion of the interior side surface part positioned on the bottom direction side of the guide part, the exterior surface being perpendicular to the widthwise direction, and
includes a slid part having a shape corresponding to the sliding part and fixed to the base plate.

5. The sliding device for an electronic apparatus as claimed in claim 1, wherein the sliding plate includes a pair of outward oriented surface parts oriented outward in the widthwise directions,
wherein the first projecting part, the second projecting part, and the contact piece are provided on each of the outward oriented surface parts.

6. The sliding device for an electronic apparatus as claimed in claim 5, wherein the sliding plate includes top surface parts adjoining to respective widthwise insides of the outward oriented surface parts and perpendicular to the top and bottom directions, and inward oriented surface parts adjoining to respective insides of the top surface parts and perpendicular to the widthwise directions, and wherein the inward oriented surface parts, the top surface parts, and the outward oriented surface parts define rectangular groove-shaped spaces that are through in the front and rear directions.

* * * * *